Oct. 16, 1962 R. A. MAROTTO ETAL 3,058,670
NOZZLE AND IRRIGATOR ATTACHMENT
Filed Sept. 9, 1960 3 Sheets-Sheet 1

INVENTORS
ROBERT A. MAROTTO
ROBERT L. SAYLOR
BY
*Townsend and Townsend*
ATTORNEYS

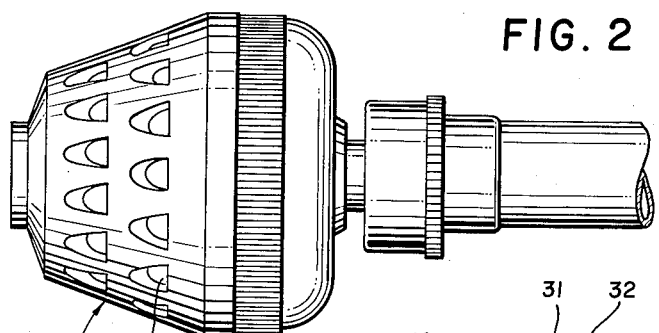
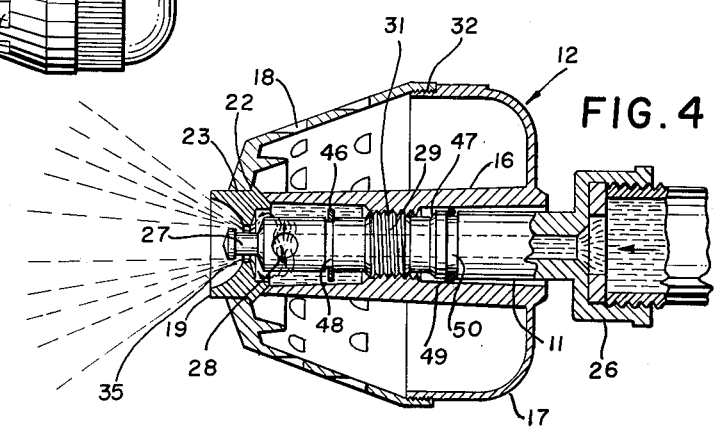
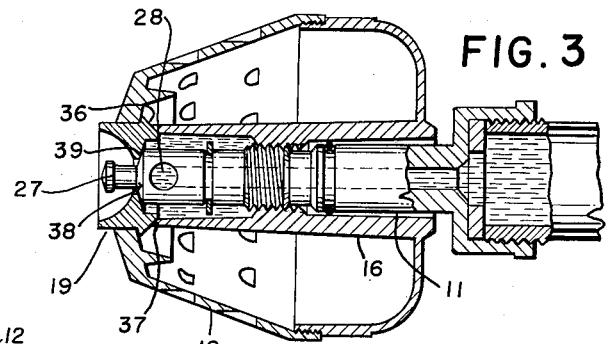
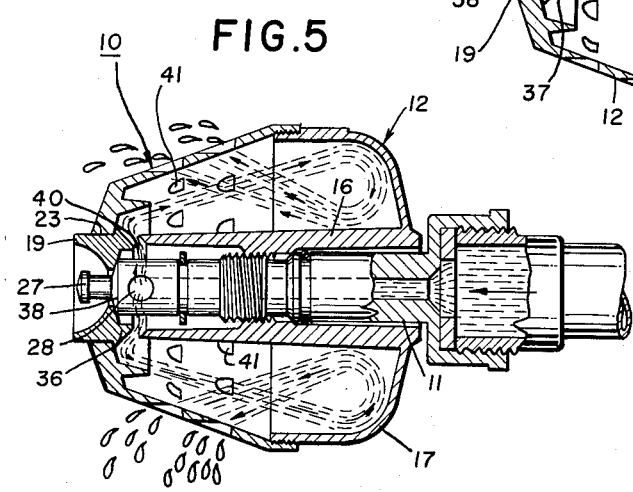

Oct. 16, 1962   R. A. MAROTTO ETAL   3,058,670
NOZZLE AND IRRIGATOR ATTACHMENT
Filed Sept. 9, 1960   3 Sheets-Sheet 3

INVENTORS
ROBERT A. MAROTTO
BY ROBERT L. SAYLOR

Townsend and Townsend
ATTORNEYS

United States Patent Office 3,058,670
Patented Oct. 16, 1962

3,058,670
NOZZLE AND IRRIGATOR ATTACHMENT
Robert A. Marotto, 944 Stony Hill Road, Redwood City, Calif., and Robert L. Saylor, 32 Sutro Heights Ave., San Francisco, Calif.
Filed Sept. 9, 1960, Ser. No. 55,052
11 Claims. (Cl. 239—431)

This invention relates to attachments for garden hoses and the like and, more particularly, to a combination nozzle and irrigating attachment.

Gardening as a hobby as well as a necessary concomitant of the move toward the suburbs by large numbers of persons has increased the demand for garden tools and attachments. Though the conventional nozzle for garden hoses is of ancient vintage, more recently, aerating devices have been proposed to reduce the water velocity for soaking applications. The obvious reason is to prevent the deleterious effect of the high water velocity on various plants, shrubs and other garden stock and to facilitate deep watering. As noted, the variable nozzle which permits adjustment of water flow between a relatively low velocity—though still too high for non-harmful aerating— and a high velocity and concentrated stream of water has wide application in garden and lawn maintenance. Yet no modification of a nozzle has been provided heretofore to substantially reduce the water velocity without reducing the rate of flow to such an extent that the nozzle may be placed in a garden bed or along an area of grass without "digging" away the dirt, seeds and plants.

The basic theory behind so-called aerating devices is to provide an attachment for a garden hose which breaks the water up into a plurality of droplets thereby substantially reducing the velocity of the water. And, while there are many aerating devices currently available using dispersing screens and the like, none has so far been successfully combined with a nozzle in order to provide a unitary attachment which accomplishes both tasks efficiently.

As a result, if prior art aerating devices are used, it is necessary to turn the water off at the faucet, remove the nozzle, thread the aerating attachment on the end of the hose and then turn the faucet back on. In a similar manner, after using the aerating device, the water must be turned off at the faucet, the aerating device removed, the nozzle replaced on the end of the hose, and the water turned on. Of course, it is possible to separate these functions, but all too often a user is not at the faucet when it is desirable to switch from an aerating device to a nozzle or vice versa, hence the change requires the user to retrace his steps to the faucet or risk getting wet if he attempts to switch the devices without turning the water off.

From the foregoing, it can be appreciated that a combination attachment that can be rotated to provide a nozzle spray, an aerated discharge or block the flow of water altogether overcomes a number of disadvantages of prior art devices.

The principal object of the present invention is to provide a unitary attachment which, in operation, may successfully perform as a conventional nozzle or as an aerating device.

Another object of the invention is to provide a multi-purpose hose attachment which is simple to fabricate, rugged and easy to use.

A more limited object is to provide a multi-purpose attachment for garden hoses and the like which is operable to stop the flow of water through the attachment or discharge water either through an adjustable nozzle or an aerating device.

A feature of the invention pertains to single means for selecting the function desired or interrupting the flow of water.

Another feature of the invention pertains to the combination of an outer body member rotatably supported on an inner body member or stem of the attachment to permit the selection of a particular function.

Yet another feature of the invention pertains to cooperating with the body members to direct the water flow through a nozzle orifice or an aerating orifice as desired.

A further feature of the invention pertains to the construction of the outer body member so as to absorb the high velocity water and discharge it as low velocity droplets.

Still another feature of the invention pertains to the combination of an inner body member connectable to a source of water, an outer body rotatably supported on the inner body, and resilient means associated with the outer body and responsive to relative movement between the bodies to control the flow of water through the inner body.

A somewhat more limited feature of the invention pertains to the combination in a nozzle and aerating device of a body member comprising two sleeves supported along a common axis and normally maintained in contacting relation at one set of ends by an outer perforated sleeve attached to the opposite ends of the common axis sleeves, and a control spindle supported interior of the common axis sleeves and adapted to move along the common axis, the spindle cooperating with internal portions of the common axis sleeves to direct a flow of water from the interior of the spindle along the common axis when the spindle is disposed towards the rearward end of the sleeves and to direct the flow of water through the otherwise closed peripheral aperture between the common axis sleeves and outward through the perforations when the spindle is disposed towards the forward end of the sleeves.

Specifically, a feature of the invention pertains to a combination nozzle and aerating attachment for garden hoses comprising an inner body member longitudinally apertured to permit the passage of water therethrough, means for connecting a source of water to one end of the inner body member, a nozzle valve formed on the other end of the inner body member, an outer body member having a plurality of aerating openings formed in its outer surfaces rotatably supported on the inner body member for longitudinal movement between retracted and extended positions, an apertured valve seat insert supported at the forward end of the outer body for cooperation with the nozzle valve as the outer body is rotated toward the extended position to permit an increasing volume of water to flow through the valve seat aperture in the nozzle and as the outer body is rotated toward the retracted position closing the path through the nozzle and thereafter opening a path between the valve seat insert and a portion of the outer body member to the aerating outlets.

In accordance with one embodiment of the present invention, a hollow spindle or inner body member having a hose connector on one end and a valve on the outer end cooperates with an outer, aerating body threadedly supported thereon by a sleeve portion. Orifices adjacent the valve or forward end of the spindle permit water to flow through the spindle into the space between the spindle and the sleeve. Depending upon the translational position of the outer body member with respect to the spindle, water in the intermediate space is directed through a nozzle orifice in the forward end of the aerating body with which the valve cooperates or through aerating outlets formed in the aerating body. To reach the aerating outlets or orifices requires the opening of a normally closed peripheral orifice between the forward end of the sleeve portion and a part of the aerating body which is obtained by translationally holding the nozzle orifice member while moving the other part of the body away from it. At a position intermediate the nozzle and aerating positions, the nozzle valve abuts the valve seat formed at the forward end of the aerating body to prevent the flow of water therethrough and the forward end of the sleeve abuts the nozzle orifice member to close the peripheral orifice to the aerating outlets.

Looking to the operation of this first embodiment, when the aerating body is rotated clockwise with respect to the spindle (judged from the position of a person holding the hose), the aerator or outer body member moves forwardly which breaks the valve away from the valve seat and permits water to flow through the nozzle. Depending upon the particular degree of rotation away from the closed or intermediate position, the flow of water through the nozzle can be regulated in accordance with conventional practice. On the other hand, when the aerating body is rotated counterclockwise from the normal or closed position, the forward end of the sleeve separates from the rear surface of the valve orifice member, the latter being held against translational movement by the valve, by flexing the rear part of the outer body. This permits water to flow through the peripheral orifices to the aerator outlets. Due to the configuration of the surfaces adjacent the peripheral orifice and the interior construction of the aerator body, the water must pass through the curtain or sheet of water established by the peripheral orifice to reach the aerating outlets. This configuration causes the peripheral sheet of water to further break up the aerated spray of water into low velocity droplets.

In the second embodiment of the invention, instead of flexing the rear part of diaphragm of the outer body in order to open the peripheral aperture between the rear surface of the valve orifice member and the sleeve, the valve orifice member is formed as an insert which is biased rearwardly with respect to the aerating body so that rotation of the body in a counterclockwise direction causes the valve to move the valve orifice member forwardly against the restoring force of the biasing means until the peripheral aperture is opened. Naturally, upon rotation of the aerator body in a clockwise direction, the aerator body moves forwardly and the restoring force of the biasing means reseats the valve orifice member against the forward end of the body sleeve.

These and other objects and features of the present invention may be more fully understood when the following detailed description is read with reference to the drawings, in which:

FIG. 2 is a side view of the nozzle and aerator attachment of FIG. 1 assembled and threadedly supported on the end of a hose;

FIG. 3 is a cross-section of the attachment of FIG. 2 when the outer body member is in the normal or closed position with the flow of water through the attachment completely interrupted;

FIG. 4 is a cross-section of the attachment depicted in FIG. 2 after the outer body member is rotated fully clockwise to its forwardmost position to direct water through the nozzle;

FIG. 5 is a cross-section of the attachment depicted in FIG. 2 after the outer body member is rotated fully counterclockwise to its rearmost position to open a path to the aerator outlets through the peripheral orifice;

Figure 6:
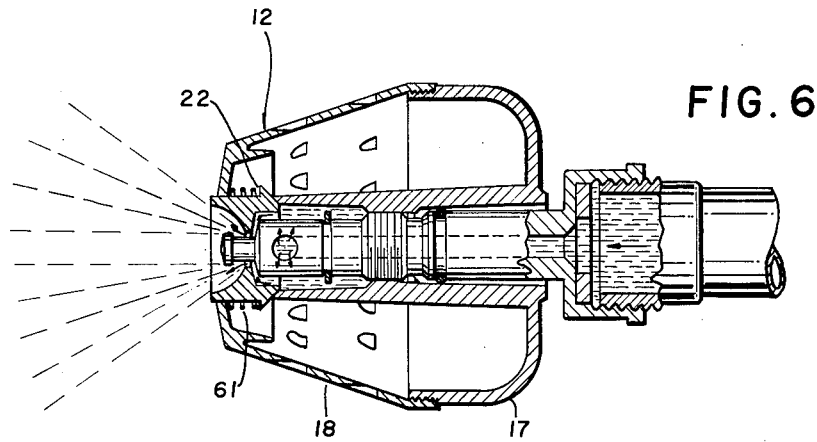
Figure 7:
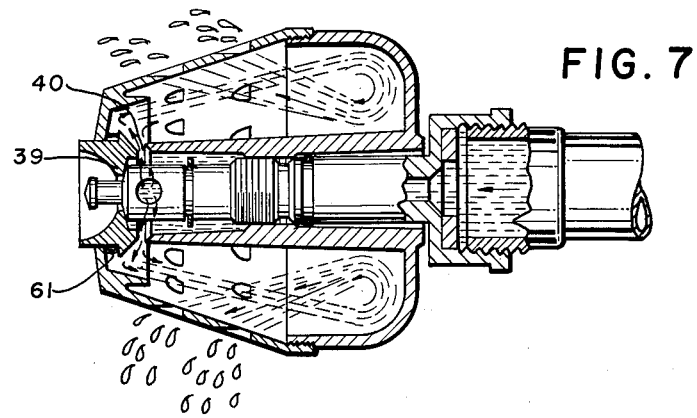

FIG. 6 is a cross-section of a second embodiment of the present invention after the body is rotated fully clockwise to its forwardmost position to direct water through the nozzle; and, FIG. 7 is a cross-section of the second embodiment of the present invention after the body is rotated fully counterclockwise to its rearmost position to open a path to the aerator outlets through the peripheral orifice.

Figure 1:
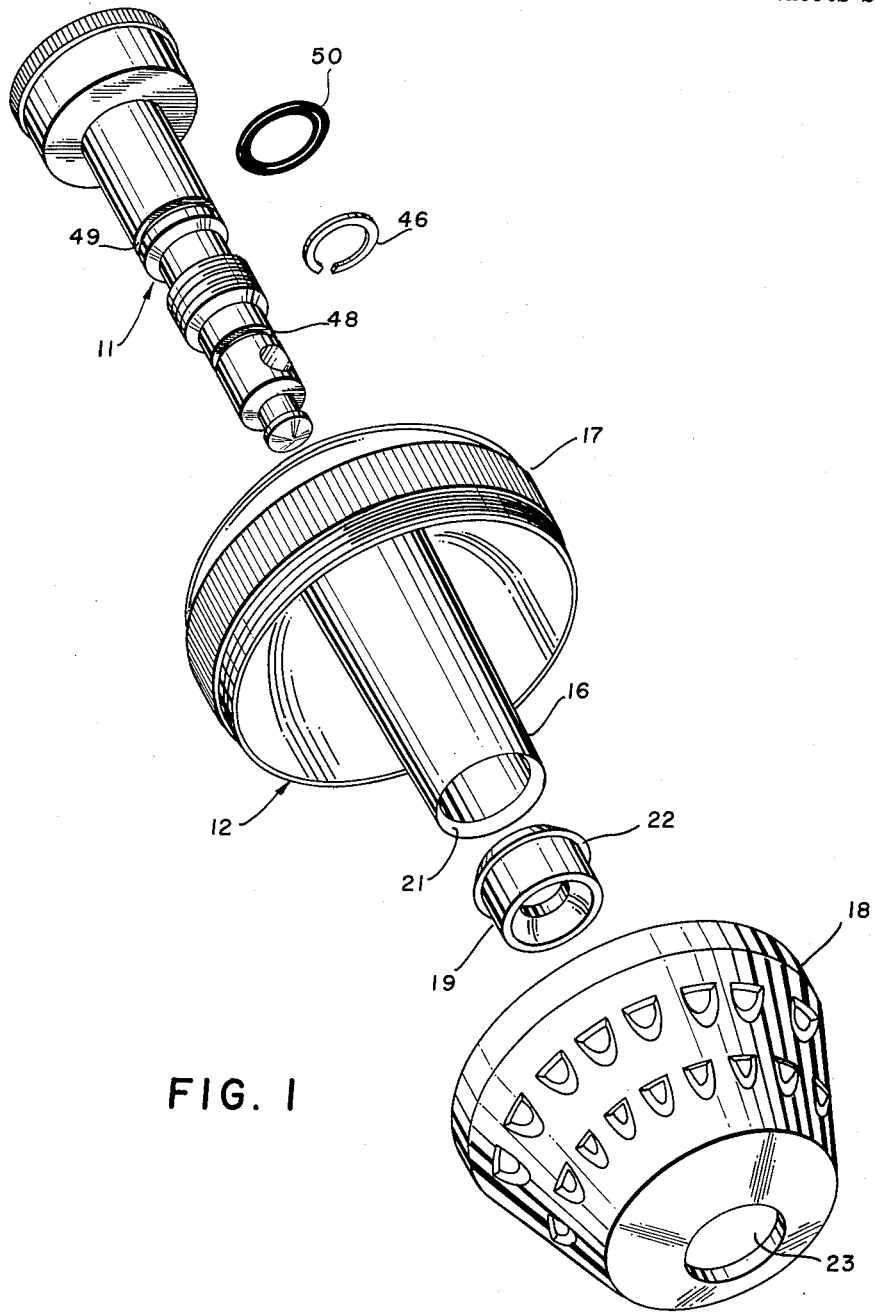
FIG. 1 is an exploded view of a first embodiment of the nozzle and aerating attachment showing the principal component parts.

FIG. 1 discloses an exploded view of a preferred embodiment of the present invention which is depicted in cross-section in FIGS. 2–5. The combined nozzle and irrigating or aerating attachment 10 consists principally of a spindle or barrel member 11 and an aerating body or bulb assembly 12. The aerating body 12 includes an inner sleeve 16 having a cup shaped diaphragm 17 formed at one end thereof and threaded at its unattached end to cooperate with a hollow, conical body member 18. Also forming a cooperating part of the aerating body 12 is a valve seat insert or sleeve 19 which is positioned interior of aperture 23 formed in the forward end of conical body 18. The insert 19 is normally urged into abutting contact with the forward end 21 of the sleeve 16 by outer body member 18 when connected to diaphragm 17. As can be observed in FIG. 1 as well as in FIGS. 3–5, valve seat insert 19 has a shoulder 22 which is engaged by the edges defining the aperture 23 formed at the forward end of the outer body 18.

Looking more particularly to FIGS. 2–5, which disclose the embodiment shown in exploded perspective in FIG. 1, it will be noted that the spindle 11 has a hose connector 26 formed on one end and a circular valve 27 formed on its other end. The spindle or inner barrel 11 is apertured between the connector 26 and a plurality of orifices 28 formed about the periphery of the spindle at the forward end thereof. A number of helical threads 29 are cut along an intermediate portion of the spindle 11 and threadedly engage corresponding threads 31 formed along an internal portion of the sleeve 16.

The aerating body 12 includes the inner sleeve 16 which threadedly engages the spindle 11, the cup shaped diaphragm 17 exemplarily formed as an integral part of its rearward end (with respect to the hose connector) and the outer body 18 which is threadedly connected to the forward end of the diaphragm 17 as illustrated at 32. The rear surface 36 of valve seat insert 19 is normally retained in contacting relation against the forward end of the sleeve 16 by the inner edge defining aperture 23 in the aerator body 12 engaging shoulder 22, as mentioned above. The normal positions of the valve seat insert 19 with respect to the sleeve 16 and aerating body 12 is shown in FIGS. 3 and 4.

As can be observed in FIG. 3, when the beveled rearward surface 36 of the valve seat insert engages the corresponding beveled surface 37 formed on the forward end of the sleeve 16 and the beveled surface 38 formed on the forward end of the spindle 11 abuts the rearward surface 39 of the valve seat insert 19, water cannot flow through the spindle 11 and orifices 28 to the nozzle or into the interior part of the aerating body 12.

However, as the aerating body 12 is rotated clockwise with respect to the spindle 11 (judged by a person holding the hose and attachment), valve seat 19 moves away from the valve 27 which permits water to flow from the orifices 28 through the valve aperture 35. Depending upon the degree of rotation of the aerating body 12 with respect to the spindle 11, the stream of water through the valve or nozzle portion of the attachment can be varied.

When it is desired to interrupt the nozzle spray of water and to use the attachment as an aerating or deep watering device, the aerating body 12 is rotated in a counterclockwise direction past the cut off position for both functions. It will be remembered that when the aerating body 12 is positioned as indicated in FIG. 3, the valve 27 bears against the valve seat insert 19 to prevent the flow of water through the nozzle portion. As the aerating body 12 is rotated further in a counterclockwise direction, the diaphragm 17 flexes to permit the forward end 37 of the sleeve 16 to move away from the cooperating surface 36 of the valve seat insert 19 while valve 27 maintains insert 19 and the forward part of the aerator body fixed with respect to the spindle 11. Once the radial aperture between surfaces 36 and 37 is formed, water flow from the orifices 28 flows through the aperture into the space between the outside of the sleeve 16 and the conical body 18. As shown particularly in FIG. 5, the water is directed, due to the particular configuration of the forward end of the outer body 18 against the diaphragm 17, the outer surface of the sleeve 16 and thence outward through a plurality of orifices 41 formed about the periphery of the body 18. Here again, by selecting the degree of clockwise rotation from the off position, the amount of water that is permitted to flow through the peripheral aperture or orifice 40 may be selected depending upon the degree of soaking desired.

It should be noted that as the water leaves the orifice 28 and flows through the aperture 40, its direction is changed upwards of seven or eight times, which changes cooperate to substantially reduce the water velocity to a point that, when it leaves the aerating apertures 41, it is a relatively slow and non-turbulent flow. Important too is the configuration of the cup 17 which directs the reflected curtain of water back through itself (see FIGS. 5 and 7) to break up the water.

In addition to the foregoing features, means are provided to prevent overtravel of the aerator body 12 with respect to the spindle 11 (FIGS. 2–4). A split washer 46 is disposed in annular groove 48 of spindle 11 to limit the forward movement of the aerator body by abutting a shoulder adjacent the forward ends of threads 31. A shoulder 47 is formed on spindle 11 to abut the shoulder at the rearward end of threads 31 to limit the rearward movement of the aerator body 12. In addition to the limiting stops, an O ring 49 is disposed in an annular groove 50 on the spindle 11 to block water that might leak through the threads 31, 32 and prevent it from flowing out between the sleeve 16 and spindle 11.

In connection with the foregoing description, it should be remembered that the diaphragm 17 is a flexible member which permits the forward end of the sleeve 16 to move away from the valve seat insert or sleeve 19 and also provides the restoring force necessary to close the aperture between the sleeves when the outer body 12 is subsequently rotated in a clockwise direction. While a number of resilient materials may function satisfactorily in this connection, it is desirable to avoid the use of metal since it is subject to rusting when maintained in contact with water. In the exemplary embodiment, the aerating body 12 is formed of a resin marketed by Du Pont de Nemours Company under the trademark "Delrin." This type of acetal resin is a highly crystalline and stable form of the polymerized formaldehyde which has mechanical properties approximating many metals. It forms a particularly efficient and effective resilient diaphragm that has the necessary restoring force to assure reseating between the surfaces forming the peripheral orifice.

The second embodiment of the present invention disclosed in FIGS. 6 and 7 is designed to permit the use of a relatively non-flexible diaphragm. Functionally, the embodiment depicted in FIGS. 6 and 7 operates similarly to that illustrated in FIGS. 1–5. For this reason, like parts are given the same numbers and the description is limited to those components and features which constitute departures from the first embodiment. In the second embodiment, the aerating body 12 is again formed of an inner sleeve 16, a cup shaped diaphragm 17 and an outer body 18 connected thereto. However, rather than rely upon the "flexing" of the cup member 17 to provide positive seating between the surfaces 36 and 37 of the sleeve 16 and valve seat insert 19, respectively, helical spring 61 reseats the valve seat insert 19 against the forward end of the sleeve 16 (FIG. 6).

A comparison of the embodiments, therefore, shows that in the first embodiment the means for maintaining the peripheral orifice 40 closed is the resilient force of the cup member 17, whereas in the second embodiment, helical spring 61 maintains the aerating orifice 40 closed until the proper relational position between the aerating body 12 and the sleeve 11 obtains. The spring 61 is placed over the insert 19 and is held between the edges defining aperture 23 in the aerator body 12 and the shoulder 22 formed on insert 19. When the aerating body 12 is disposed forwardly with respect to the spindle 11 so that the nozzle is operative, the helical spring 61 holds insert 19 firmly against the forward end of sleeve 16. On the other hand, as the aerator body 12 is rotated rearwardly, the valve end of spindle 11 holds the valve seat insert 19 stationary with respect to the spindle 11 and the edge of the body defining aperture 23 moves rearwardly with the movement of the body 12 to compress spring 61 against the shoulder 22 formed on the valve seat insert 19. These two positions are illustrated in FIGS. 6 and 7. FIG. 6 illustrates how the expanded spring 61 maintains the peripheral orifice 40 closed when the attachment is used as a nozzle and FIG. 7 illustrates how the spring 61 is compressed to permit the orifice 40 to open when the attachment is employed for irrigating or deep soaking.

While the foregoing invention has been described with respect to two exemplary embodiments, it should be apparent to those skilled in the art that certain other modifications and variations are possible without departing from the spirit and scope of the present invention. The basic concept is one of a unitary multi-purpose attachment which by a simple rotational movement provides an adjustable nozzle spray, an aerating or irrigating flow of water and a cut-off position. The invention, therefore, should be in no wise limited except to the extent of the appended claims.

What is claimed is:

1. In a nozzle and aerating device for providing an adjustable spray of water through a nozzle orifice or a low velocity curtain of water through aerating orifices, the combination of a body member comprising two sleeves supported along a common axis and normally maintained in contacting relation at one set of ends by an outer perforated sleeve affixed to the opposite ends of the common axis sleeves, a hollow control spindle having a forward end supported interior of said common axis sleeves and adapted to move along said axis, said spindle cooperating with internal portions of said common axis sleeves to direct a flow of water from the interior of said spindle along the common axis of the sleeves and adjacent said forward end when the spindle is disposed towards the rearward end of said sleeves and when the spindle is disposed towards the forward end of said sleeves to direct the flow of water only through the otherwise normally closed peripheral aperture between said common axis sleeves and outward through the perforations by separating the ends of said sleeves from contacting relation.

2. In a combination nozzle and aerating device for providing an adjustable spray of water through a nozzle orifice and a low velocity source of water through an aerating orifice in accordance with claim 1 wherein the end of said spindle cooperates with the common axis sleeve at said forward end to provide an adjustable high velocity flow of water.

3. In a combination nozzle and aerating device for providing an adjustable spray of water through a nozzle orifice and a low velocity source of water through an aerating orifice in accordance with claim 2 wherein said outer sleeve is constructed to direct the curtain of water emanating from said peripheral orifice rearwardly against a deflecting surface which reverses the direction of the curtain and causes it to collide with and penetrate the incidence sheet of water in reaching the perforations in said outer sleeve.

4. A combination nozzle and aerator device including a barrel member formed to discharge water adjacent the forward end thereof, a body member supported on said barrel for movement along the axis thereof, first means cooperating with the forward ends of said barrel and said body member to provide a controlled spray of water through a nozzle valve orifice when the body member is moved forwardly preselected distances with respect to the axis of the barrel, and means including a part of the body member cooperating with the forward end of said barrel and said first means operable as the body member is moved rearwardly with respect to the axis of the barrel to cut off the flow of water through the nozzle orifice and thereafter direct the flow to aerating orifices formed in the exterior of said body member, said body member including a diaphragm portion that flexes to extend said body member as it moves rearwardly thereby to provide a peripheral path for water flow from the barrel member radially outwardly between the barrel and the body member and through the aerating orifices.

5. In a combination device for providing an adjustable nozzle spray, a soaking source of water and means for interrupting the flow of water wherein a hollow spindle having a valve on its forward end and connected at its rearward end to a source of water supports a body member and the relative translational position between the member and spindle determines the setting desired, the improvement comprising the body member formed with an inner sleeve threadedly engaging the spindle, an aerating cone and a forward sleeve apertured to cooperate with the valve end of the spindle to provide a nozzle spray; a cup member connecting the end of the inner sleeve adjacent said connector end of the spindle to the rearward edge of the aerating cone; and resilient means to urge the forward end of said forward sleeve in aligned abutting relation to the free end of the inner sleeve when the body member is positioned with respect to the spindle to provide an adjustable nozzle spray and to shut off the flow of water altogether; the contact between said forward sleeve and inner sleeve interrupted when the body member is positioned with respect to the spindle to provide soaking water, said soaking position being obtained by maintaining said forward sleeve in a fixed relation to said valve while moving said inner sleeve rearwardly away therefrom against the urging of said resilient means.

6. An attachment device for a garden hose and the like to selectively provide a variable nozzle spray, interrupt the flow of water and provide an aerating spray comprising, in combination, a hollow spindle having a hose connecting means on one end and a valve on the other end and a plurality of radial orifices formed adjacent the valve end; and an aerating body supported for translational movement along said spindle; said body comprising a support sleeve, a truncated dispersion cone and a resilient diaphragm cup member integrally connected to the end of the sleeve adjacent said one end of the spindle, said support sleeve threadedly engaging said spindle to permit movement of the aerating body between a retracted position adjacent the nozzle connector end of the spindle and an extended position adjacent the valve end of the spindle; and a valve seat supported at the extended end of said cone to cooperate with the free end of said sleeve and apertured to cooperate with the valve; said aerating body when rotated to its extended position opening the valve permitting the flow of water through said spindle orifices and said valve seat aperture while blocking the flow of water between the forward end of said sleeve and said valve insert and in said retracted position blocking the flow of water through said valve seat by seating said valve while permitting the flow of water through said spindle orifices and the peripheral aperture opened between said valve seat and the forward end of said sleeve, said resilient diaphragm formed to urge the valve insert and free end of the sleeve into contacting relation and flexible to permit the opening of said peripheral aperture, and said aerating body in the position intermediate said extended and retracted positions blocking the flow of water both through said valve seat aperture and through said peripheral orifices.

7. An attachment device for a garden hose and the like to selectively provide a nozzle spray, interrupt the flow of water and provide an aerating spray comprising, in combination, a hollow barrel having coupling means on one end for connecting a hose thereto, a valve on the other end and at least one radial aperture formed in the side thereof adjacent the valve; said barrel having a plurality of helical threads formed about an intermediate portion of the outer surface thereof; a hollow body member including an inner sleeve threaded for engagement with the threads formed on said barrel and an outer shell having a plurality of aerating orifices therethrough; a valve seat insert supported at the front end of said shell to cooperate with said valve and having a rear surface cooperable with the forward end of said sleeve; means cooperating with said shell to urge said insert against the forward end of said sleeve, said body member in the normal position with respect to said barrel cutting off the flow of water through the attachment by closing the apertures between said valve and valve seat and between the rear surface of said insert and the forward end of said sleeve; means for rotating the body member in one direction from the normally closed position to move the body member away from said coupling means to increasingly separate said valve from said valve seat thereby providing an adjustable stream of water through the nozzle orifice and to rotate the body member in the opposite direction from the normally closed position to separate the rear surface of said valve seat from the outer end of said sleeve so water may flow through the peripheral orifice therebetween toward said aerating orifices, said outer shell being constructed to deflect the curtain of water from said peripheral orifice back through itself as it moves toward said aerating outlets, and means cooperating with said sleeve to limit the translational movement of said body member with respect to said barrel.

8. An attachment for a garden hose to provide a selective nozzle spray, an off position, and an aerated spray comprising, in combination, a barrel having a valve head formed on one end and coupling means on the other end, said coupling means adapted to cooperate with a hose and said barrel apertured to provide a path for the flow of water therethrough from the coupler by way of apertures formed in the sides of the barrel immediately behind said valve head, a plurality of helical threads cut along the middle portion of the barrel; a body member including a sleeve internally threaded to engage the threads on said barrel, a cup shaped flexible diaphragm formed at the rear end of the sleeve, a conical sleeve connected at its rearward end to the forward end of the diaphragm, and an apertured valve seat supported at the forward end of said conical sleeve in line with said barrel; the rear surface of said valve seat abutting the forward end of said sleeve and said valve head abutting said valve seat to prevent the flow of water through the attachment when said attachment is in the cut off position, said body member upon rotation to move in translation away from the coupling means selectively opening the nozzle orifice between the valve head and the valve seat without affecting the peripheral orifice between the forward end of said sleeve and the rear surface of said valve seat and upon rotation to move in translation toward the coupling means maintaining the valve head against said valve seat while displacing said sleeve away from said valve seat thereby to permit water to flow through said peripheral orifice; and means cooperating with said sleeves to absorb energy by deflecting the water flowing interior of said conical sleeve thereby reducing its velocity to a low order and breaking it up into a plurality of droplets for discharge through aerating orifices formed in said conical sleeve.

9. An attachment for a garden hose to provide a selective nozzle spray, an off position, and an aerated spray in accordance with claim 8 wherein stop means are provided to prevent disengagement of the threaded parts of said barrel and sleeve.

10. A combination nozzle and aerating device comprising a hollow barrel having a hose coupling on one end and a nozzle valve head on the other and a bulb assembly including an inner sleeve supported about said barrel for translational movement with respect thereto, a valve seat member supported at the forward end of said bulb assembly, said valve seat member when the bulb assembly is disposed forwardly with respect to said barrel abutting the forward end of said inner sleeve and cooperating with the valve head to permit the establishment of an adjustable stream of water therethrough, means for moving the inner sleeve part of said bulb assembly in rearward translation with respect to said barrel so that the nozzle valve head seats on said valve seat member to interrupt the flow of water through the nozzle aperture and barrel and as additional rearward translation occurs causes the forward end of the sleeve to separate from the rear surface of said valve seat member by distending the bulb assembly.

11. A combination nozzle and aerating device in accordance with claim 10 wherein the bulb assembly is apertured and internal means reduce the velocity of the flow of water between said valve seat and said sleeve.

References Cited in the file of this patent

UNITED STATES PATENTS

| | | |
|---|---|---|
| 2,192,639 | Eckard | Mar. 5, 1940 |
| 2,333,767 | Davis | Nov. 9, 1943 |

FOREIGN PATENTS

| | | |
|---|---|---|
| 180,911 | Switzerland | Nov. 30, 1935 |
| 812,737 | Great Britain | Apr. 29, 1959 |
| 819,799 | France | July 19, 1937 |
| 897,391 | France | May 22, 1944 |